April 12, 1932.  H. A. WHEELER ET AL  1,853,480

SOLAR WATER HEATER

Filed May 7, 1929

Witness
H. Woodard

Inventors
Henry A. Wheeler
Frank J. Bentz
By H. B. Willson &co.
Attorneys

Patented Apr. 12, 1932

1,853,480

UNITED STATES PATENT OFFICE

HENRY A. WHEELER, AND FRANK J. BENTZ, OF MIAMI, FLORIDA; SAID WHEELER ASSIGNOR OF ONE-FOURTH TO FRANK J. BENTZ AND ONE-FOURTH TO L. E. BENTZ, OF MIAMI, FLORIDA

SOLAR WATER HEATER

Application filed May 7, 1929. Serial No. 361,110.

The invention relates to solar water heaters of the general type in which a storage tank is provided for the water whose temperature is raised by a sun-heated coil or the like, and it is the principal object of the invention to provide a new and improved construction in which no water may pass to the tank from the sun-heated water heating means, until the water has been raised to a predetermined temperature.

In carrying out the above end, a thermostatic valve is provided controlling the outlet from the heating coil or the like, said valve being opened when water in said coil or the like has become heated the required amount, but remaining closed as long as the water is under said predetermined temperature. This is not only of advantage in discharging hot water to the tank during the daytime, but is also advantageous at night, for the heating coil or the like is not then functioning and the valve remains closed, so that no cold water may be discharged into the tank.

A still further aim is to provide a new and improved construction which is exceptionally simple and inexpensive, yet is highly efficient.

With the foregoing in view, the invention resides in the novel subject matter hereinafter described and claimed, description being accomplished by reference to the accompanying drawings.

Fig. 2 is a longitudinal sectional view showing one form of thermostatic valve which may be used at the outlet of the heating coil or the like.

Figure 1:
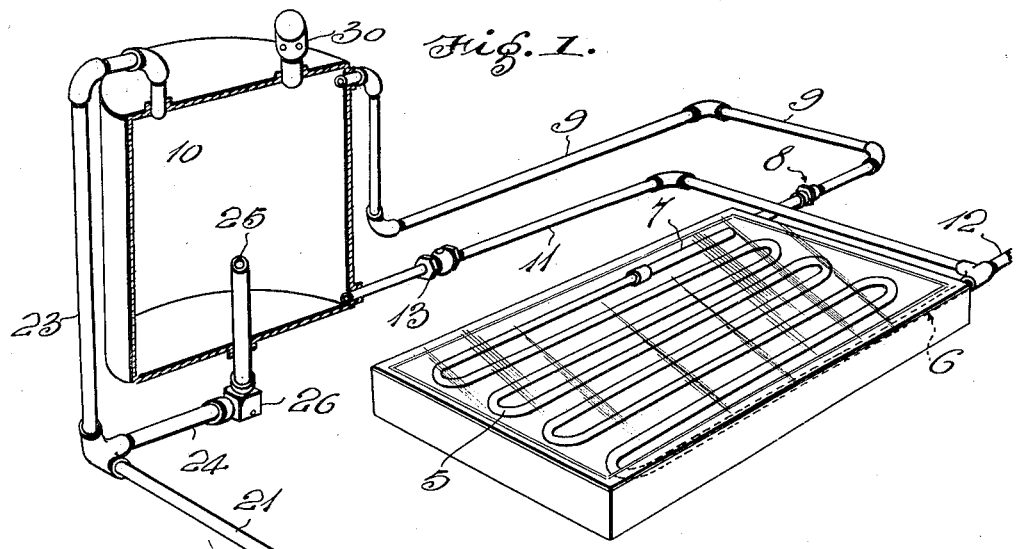
Fig. 1 is a sectional perspective view.

The form of construction selected for illustration in the present application, will be rather specifically described, with the understanding that within the scope of the invention as claimed, minor variations may be made.

The numeral 5 denotes a sun-heated water heating coil whose inlet end is denoted at 6 for future reference. The outlet of the coil 5 is formed from a length 7 of pipe of such a nature as to longitudinally expand under the influence of heat, copper or other metal having a high co-efficient of expansion being used for this pipe. Connected by a union or the like 8 to the outer end of the pipe 7, is a hot water conducting pipe 9 which discharges into the upper portion of a closed hot water storage tank 10. A return pipe 11 extends from the lower portion of the tank 10 to the inlet end 6 of the coil 5, and a supply pipe 12 for water under pressure also connects with said inlet end 6 of said coil. Hot water from the coil 5 passes through the pipe 9 to the upper end of the tank 8 and relatively cool water from the lower end of said tank returns through the pipe 11 to the coil to be reheated and this circulation of water will take place as long as none is being drawn off from the tank 10. When a discharge valve from this tank is opened however water under pressure from the pipe 12 passes through the coil 5, is heated by the latter and passes on through the pipe 9 to the tank 10 to take the place of the water being drawn off. To prevent the cold water from the pipe 12 from short-circuiting around the coil 5, to the lower end of the tank 10, the pipe 11 is provided with a check valve 13 which closes toward said tank, and due to the provision of a thermostatic valve provided in part by the pipe 7, no water can discharge from said coil 5 until it has been heated to a predetermined temperature.

Figure 2:
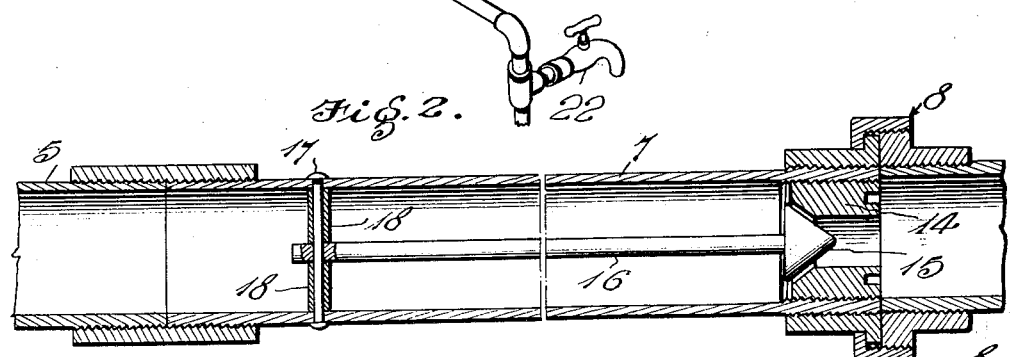

In Fig. 2, a valve seat 14 has been shown threaded into the outlet end of the pipe 7 and accessible for adjustment when the union 8 is disconnected. Co-operable with this seat, is a valve 15 carried by one end of a rod 16 having a co-efficient of expansion which is practically infinitesimal at the temperature at which pipe 7 will elongate materially. The end of rod 16 remote from the valve 15 is secured to the pipe 7, for instance by a rivet 17, and spacing sleeves 18 preferably surround this rivet between the rod and the wall of the pipe.

The seat 14 is so adjusted that whenever pipe 7 is at a relatively low temperature, said seat contacts with the valve 15 and no discharge of water can take place through the pipe 7. When the water has become heated sufficiently however, the pipe 7 elongates under the increase in temperature, moving the seat 14 away from the valve 15 and allowing discharge of the heated water into the tank 10.

Figure 3:
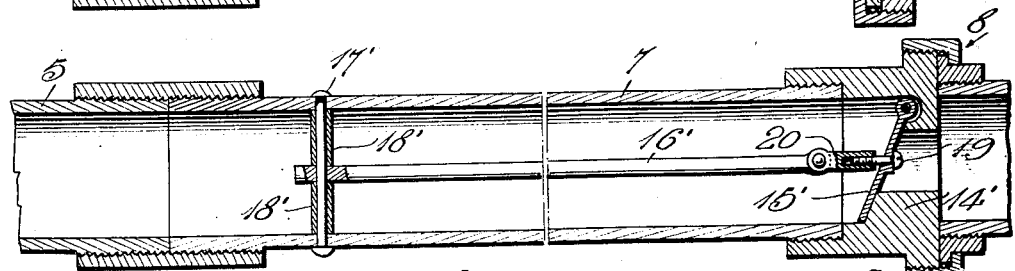
Fig. 3 is a view similar to Fig. 2 but showing a different form of valve.

In Fig. 3, the parts 16', 17' and 18' correspond to the parts 16, 17 and 18 above described. A pivoted valve 15' is provided however, co-operable with a stationary seat 14' and an adjustable connection by means of a screw 19, is provided between said valve and a pivoted terminal 20 on the rod 16'. Screw 19 is accessible for adjustment upon disconnection of the union 8 and when it is properly set, the valve functions in the same manner as that above described, opening at relatively high temperature and closing at low temperature to control passage of water through the coil 5 and to prevent discharge of any water from the latter until it has become heated a predetermined amount.

A discharge pipe 21 is shown for the tank 10, provided with a spigot 22 or with any number of such spigots at desired locations. This pipe 21 is shown as provided with an upper branch 23 communicating with the upper portion of the tank 10 and with a lower branch 24 communicating with the lower portion of said tank, the inlet end 25 of branch 24 being preferably somewhat above the tank bottom so that the relatively cool water in the lower end of the tank will never discharge through said branch.

The top of the tank 10 is provided with an automatic air escape and air inlet valve 30 of known type. Whenever tank 10 is being filled, valve 30 permits escape of air until said tank is full. Whenever water is being drawn off from the tank by gravity, the valve 30 admits air into the upper end of said tank.

During the daytime, the thermostatic valve at the outlet of the coil 5 permits all water properly heated by said coil to pass to the tank 10 and circulation of water is permitted as above explained, the relatively cool water from the lower end of tank 10 returning to the coil 5 through the pipe 11 and its check valve 13. Whenever a spigot 22 is opened, the hot water under pressure entering the tank 10 forces hot water from the latter through the branches 23 and 24. At night, the thermostatic valve remains closed and no water can enter the tank 10 either directly or indirectly from the supply pipe 12. Then, whenever a spigot 22 is opened, hot water will run by gravity from the tank 10 through the branch 24. It is thus insured that after sundown, the temperature of the water in the tank 10 shall not be decreased by admission of cold water each time hot water is drawn off. The result is that ample hot water is carried over for the next morning's use.

Due to the excellent results obtainable from the general construction disclosed, it is preferably followed. However, within the scope of the invention as claimed, minor variations may be made as above explained.

We claim:

1. In a solar water heating system, a hot water storage tank having a valved discharge line through which hot water may be drawn off from the system, a solar water heater having a water inlet and a water outlet, a water pipe from said heater outlet to said tank for conducting hot water to said tank to replace the hot water drawn from the system through said discharge line, a water supply line leading to said heater inlet from a domestic or city water system for supplying the water which is to replace the hot water drawn from the system, and a thermostatic valve for controlling the outlet of said solar heater, said valve preventing cold water from said supply line from rushing through the solar heater into the tank and operable to open when the water has become heated in said solar heater.

2. In a solar water heating system, a hot water storage tank having a valved discharge line through which hot water may be drawn off from the system, a solar water heater having a water inlet and a water outlet, a water pipe from said heater outlet to said tank for conducting hot water to said tank to replace the hot water drawn from the system through said discharge line, a water supply line leading to said heater inlet from a domestic or city water system for supplying the water which is to replace the hot water drawn from the system, a thermostatic valve for controlling the outlet of said solar heater, said valve preventing cold water from said supply line from rushing through the solar heater into the tank and operable to open when the water has become heated in said solar heater, a water return pipe from the lower end of said tank to said heater inlet, whereby water may circulate through the heater and tank after opening of said thermostatic valve, and means for preventing flow of cold water from said supply pipe to the tank through said return pipe.

In testimony whereof we have hereunto affixed our signatures.

HENRY A. WHEELER.
FRANK J. BENTZ.